(No Model.)
C. SAUNDERS.
STOP MECHANISM FOR PUMP MOTORS.
No. 360,250. Patented Mar. 29, 1887.
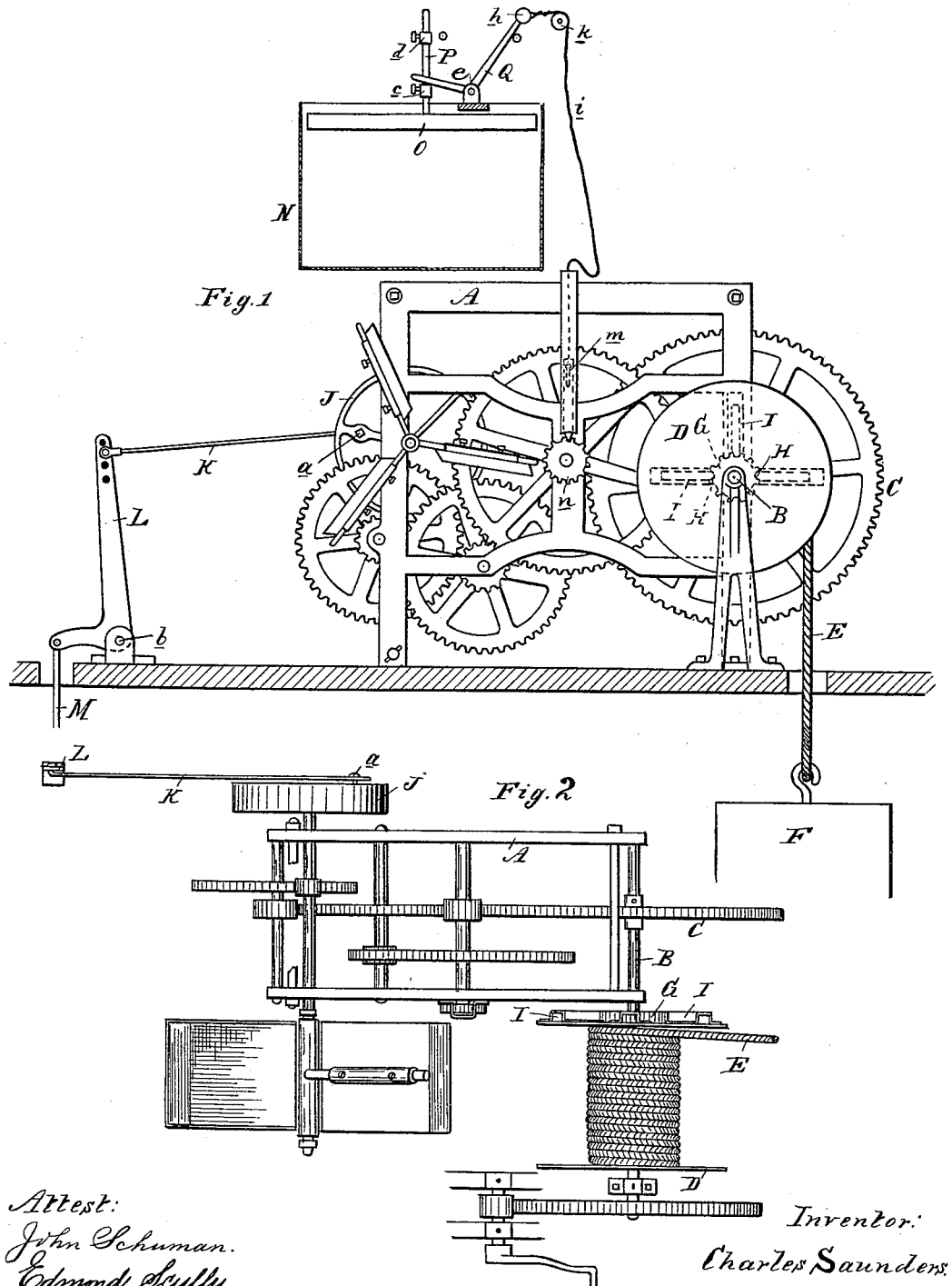

United States Patent Office.

CHARLES SAUNDERS, OF LAPEER, MICHIGAN.

STOP MECHANISM FOR PUMP-MOTORS.

SPECIFICATION forming part of Letters Patent No. 360,250, dated March 29, 1887.

Application filed July 29, 1886. Serial No. 209,398. (No model.)

*To all whom it may concern:*

Be it known that I, CHARLES SAUNDERS, of Lapeer, in the county of Lapeer and State of Michigan, have invented new and useful Improvements in Stop Mechanisms for Pump-Motors; and I do hereby declare that the following is a full, clear, and exact description thereof, reference being had to the accompanying drawings, which form a part of this specification.

This invention relates to certain new and useful improvements in devices for working pump-bobs, whereby a falling weight is the motive force to give a reciprocating motion to the pump-bob.

The object of the invention is provide mechanism by means of which the falling weight will give such reciprocating motion, such mechanism being provided with stops or detents, by means of which, the weight being wound up, the device may be started or stopped automatically by the action of the water.

The invention consists in the peculiar construction of parts, their combinations and operation, as more fully hereinafter described.

Figure 1 is a side elevation of my improved device. Fig. 2 is a top plan view of the same.

In the drawings, A represents a suitable frame, in one end of which is journaled a shaft, B, which carries the main spur-wheel C, and upon the overhanging end of said shaft is sleeved the drum D, upon which the rope E is wound, the free end of such rope being connected with the weight F. Upon this shaft B is also secured the rack-pinion G, and dogs H are inclosed in boxes I, which are secured to the end of the drum in such manner that in the rotation of the drum that dog which is vertical to the axis of the shaft will, by gravity, engage with the rack-pinion G, thereby communicating the motion of the drum occasioned by the unwinding of the rope to the shaft B. The motion of the wheel C is communicated through a speed-reducing train to a crank-wheel, J, to the wrist-pin $a$ of which the pitman K is attached, the other end of which engages with the bell-crank lever L, which is pivotally secured, as at $b$, the other arm of the lever being connected with the pump-rod M. Any suitable winding-gear may be applied to the drum for the purpose of winding up the weight when the same has run down.

N is a water-tank, into which the water brought up by the pump is forced. Within this tank there is a float, O, having a central stem, P, upon which are adjustably secured the collars $c$ and $d$.

Q is a two-armed lever, fulcrumed, as at $e$, to the top of the tank, so that the free end of the shorter arm of such lever will be in contact with the stem P. The longer arm of the lever terminates in an overweight, $h$, to which is secured a cord, $i$, running over a pulley, $k$, the opposite end of said cord being secured to the dog $m$, such dog being suitably secured to the side of the frame, so that it may have a free vertical movement to engage with the rack-pinion $n$ on one of the shafts of the train.

It will be seen that when the tank is full of water, the float resting upon the top of such water, the collar $c$ has elevated the short end of the lever Q, thereby throwing toward the pulley $k$ the opposite end of the lever, which allows the dog connected with the cord to drop by gravity and engage with the teeth of the pinion $n$, and thereby arrest the further motion of the train. As the water is used out of the tank the float falls until the collar $d$ impinges against the short arm of the lever Q and throws it down, thereby compelling the opposite end of the lever to raise the dog $m$ out of its engagement with the rack-pinion $n$, which allows the train to start again the operation of the pump.

What I claim as my invention is—

The combination, with the train of gearing and pinion $n$, as described, of the tank N, float O, carrying stem P, collars $d$ $c$ on said stem, the lever Q, fulcrumed on said float, with one arm operating between said collars, the cord $i$, carried by the other arm of said lever, and the dog $m$ on the free end of said cord, substantially as shown and described, and for the purpose specified.

CHARLES SAUNDERS.

Witnesses:
J. R. JOHNSON,
GEO. B. ADAMS.